United States Patent [19]

Komada

[11] 4,426,653
[45] Jan. 17, 1984

[54] PRINTING SYSTEM FOR FACSIMILE RECEPTION APPARATUS

[75] Inventor: Kenya Komada, Tokyo, Japan

[73] Assignee: Ricoh Company, Ltd., Tokyo, Japan

[21] Appl. No.: 304,141

[22] Filed: Sep. 21, 1981

[30] Foreign Application Priority Data

Sep. 26, 1980 [JP] Japan ................. 55-135003

[51] Int. Cl.³ .................. G01D 15/06; H04N 1/30
[52] U.S. Cl. ..................... 346/153.1; 346/150; 358/288; 358/300
[58] Field of Search ............. 346/150, 153.1; 358/260–262, 288, 296, 300; 355/14 SH

[56] References Cited

U.S. PATENT DOCUMENTS 4,115,817  9/1978  Suzuki et al. ................. 346/153.1

FOREIGN PATENT DOCUMENTS 53-19032  8/1976  Japan .

Primary Examiner—Thomas H. Tarcza
Attorney, Agent, or Firm—David G. Alexander

[57] ABSTRACT

A printing system for a facsimile transceiver includes a first sheet feed means for feeding a recording sheet toward a latent image forming station intermittently at a variable speed in accordance with an input compressed data signal. The sheet is temporarily detained to form a loop in a predetermined position past of the latent image forming station. A second sheet feed means causes the sheet to advance farther toward developing and fixing station sequentially at a constant speed by each predetermined amount in correspondence with a detained amount of the sheet. The developing station is provided with a developing member which is rotated at a constant speed in synchronism with the operation of the second sheet feed means. The fixing station is provided with a flashing light source which is energized in relation with the operation of the second sheet feed means.

14 Claims, 3 Drawing Figures

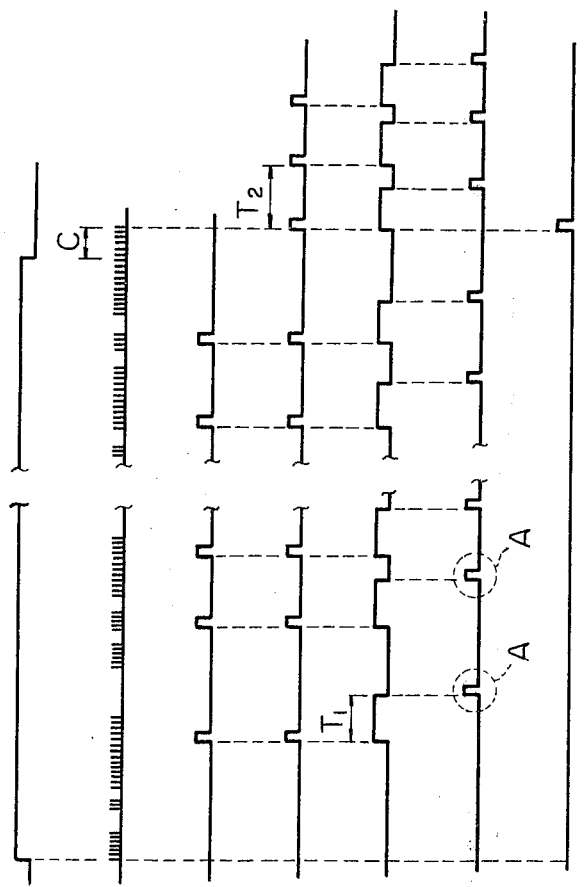

PRINTING SYSTEM FOR FACSIMILE RECEPTION APPARATUS

BACKGROUND OF THE INVENTION

The present invention generally relates to a facsimile transceiver and, more particularly, to an improved printing system for a facsimile reception apparatus for receiving and printing transmitted data in compressed form.

Facsimile transmission systems are extremely useful for transmitting original documents in numerous commercial and bureaucratic applications. The original document is scanned to produce electrical signals which are transmitted over a telephone line or the like to a remote receiver. The receiver prints a facsimile or reproduction of the original document in response to the received signals. Further, it is presently common to compress the signals for transmission using run length encoding or the like in order to increase the transmission speed.

A modern high-speed facsimile transceiver equipped with a compression device for the above purpose is designed to read data from an original document or write them in at a specific speed which corresponds to a density of the data. For this reason, a paper sheet as a recording medium is fed intermittently at a variable speed in accordance with a compressed signal particularly in a printing system at the receiver, more particularly in an electrostatic recording device of the printing system. Therefore, if an ordinary heat type fixing device were used to process a toner image on a sheet, the amount of radiated heat might be too small to fuse toner particles on the sheet or so large as to burn the sheet.

Efforts heretofore made to settle this problem may be represented by the system disclosed in Japanese Patent Publication No. 53-19032. In this system, a fixing unit employing a xenon lamp is disposed in a fixing station while a sheet feed roller is positioned past of the fixing station and driven by a stepping motor. Pulses supplied to the stepping motor are counted to energize the lamp at a proper timing for fixation. However, such a system cannot avoid drawbacks in various aspects. The stepping motor needs be of a significantly large torque since it has to feed a sheet from a latent image forming station all the way to the developing and fixing stations without any assistance. Also, such a manner of sheet feed lacks precision in the latent image forming station. Because a cutter must be located in a position past of the sheet feed roller, a disproportionate blank area is produced at the leading end of the first copy sheet. Additionally, an intricate circuit arrangement is required for energizing the lamp at an adequate timing.

In a dry process developing device, a magnet roller is usually driven by an a.c. motor at a constant speed. Thus, concerning the prior art system described above, the sheet travelling speed and the peripheral speed of the magnet roller is constantly varied relative to each other inviting an irregular density distribution in reproduced images.

SUMMARY OF THE INVENTION

It is an object of the present invention to provide a new and improved facsimile printing system which decreases the load on a stepping motor and increases the sheet feed precision in a latent image forming station to thereby reproduce clear-cut images.

It is another object of the present invention to provide a new and improved facsimile printing system which precludes a fluctuation in the relative speed between a sheet and a magnet roller for development to offer excellent images free from an uneven density distribution, and permits the fixing lamp to turn on at a proper timing in a simple yet positive manner.

It is another object of the present invention to provide a generally improved printing system for a facsimile transceiver.

In accordance with the present invention, a printing system for a facsimile transceiver includes a first sheet feed means for feeding a recording sheet toward a latent image forming station intermittently at a variable speed in accordance with an input compressed data signal. The sheet is temporarily detained to form a loop in a predetermined position past of the latent image forming station. A second sheet feed means causes the sheet to advance farther toward developing and fixing stations sequentially at a constant speed by each predetermined amount in correspondence with a detained amount of the sheet. The developing station is provided with a developing member which is rotated at a constant speed in synchronism with the operation of the second sheet feed means. The fixing station is provided with a flashing light source which is energized in relation with the operation of the second sheet feed means.

Other objects, together with the foregoing, are attained in the embodiment described in the following description and illustrated in the accompanying drawings.

BRIEF DESCRIPTION OF THE DRAWINGS

FIG. 3 is a timing chart explanatory of the operation of the facsimile printing system shown in FIGS. 1 and 2.

DESCRIPTION OF THE PREFERRED EMBODIMENT

While the printing system for a facsimile transceiver of the present invention is susceptible of numerous physical embodiments, depending upon the environment and requirements of use, substantial numbers of the herein shown and described embodiment have been made, tested and used, and all have performed in an eminently satisfactory manner.

Figure 1:
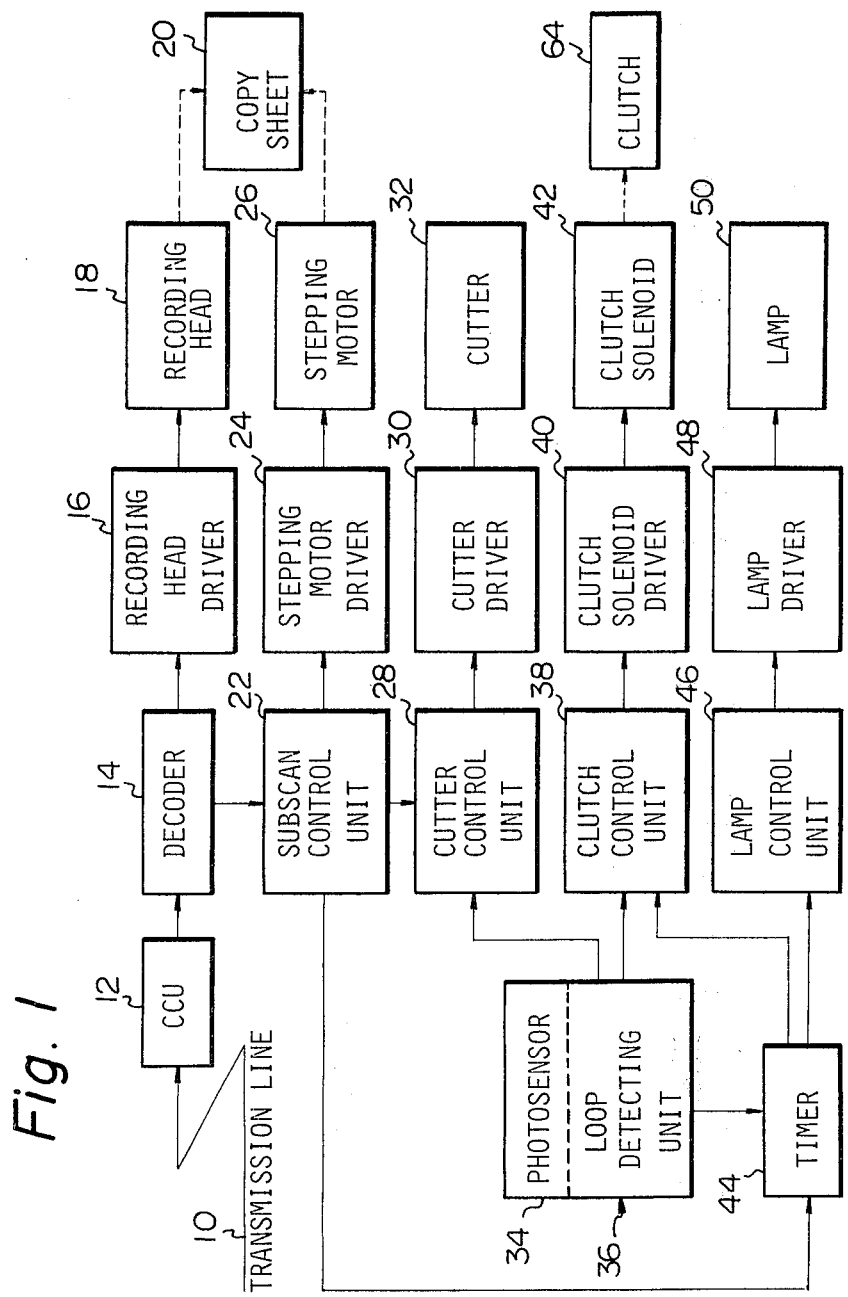
FIG. 1 is a block diagram showing a facsimile printing system of the present invention.

Referring to FIG. 1 of the drawings, the facsimile printing system embodying the present invention will be described in particular relation with the flows of data signals and control signals.

A compressed data signal from a remote transmitter is supplied through a telephone line or like transmission line 10 to a communication control unit 12 of the facsimile transceiver. The input data signal is coupled from the communication control unit 12 to a decoder 14 to be transformed into the original video signal. This decoded output of the decoder 14 is fed to a recording head 18 via a recording head drive 16. Then, the recording head 18 forms on a recording sheet 20 an electrostatic latent image which corresponds to the video data signal to be recorded.

The output of the decoder 14 is also coupled to a vertical scan or subscan control unit 22. The control unit 22 supplies a stepping motor 26 via a stepping motor drive 24 with a drive control signal which includes a sheet feeding pulse signal corresponding to the compressed data signal. The stepping motor 26 is then driven for rotation in accordance with the sheet feeding pulse signal.

Meanwhile, the output of the subscan control unit 22 is fed to a cutter drive 30 through a cutter control unit 28. A cutter 32 is driven by an output signal of the cutter drive 30. Operations of the other constituents shown in FIG. 1, i.e., a photosensor 34, a loop detection unit 36, a clutch control unit 38, a clutch solenoid drive 40, a clutch operating solenoid 42, a one-turn clutch 64, a timer 44, a lamp control unit 46, a lamp drive 48 and a lamp 50, will become apparent from the following description of a practical arrangement or construction of the printing system.

Figure 2:
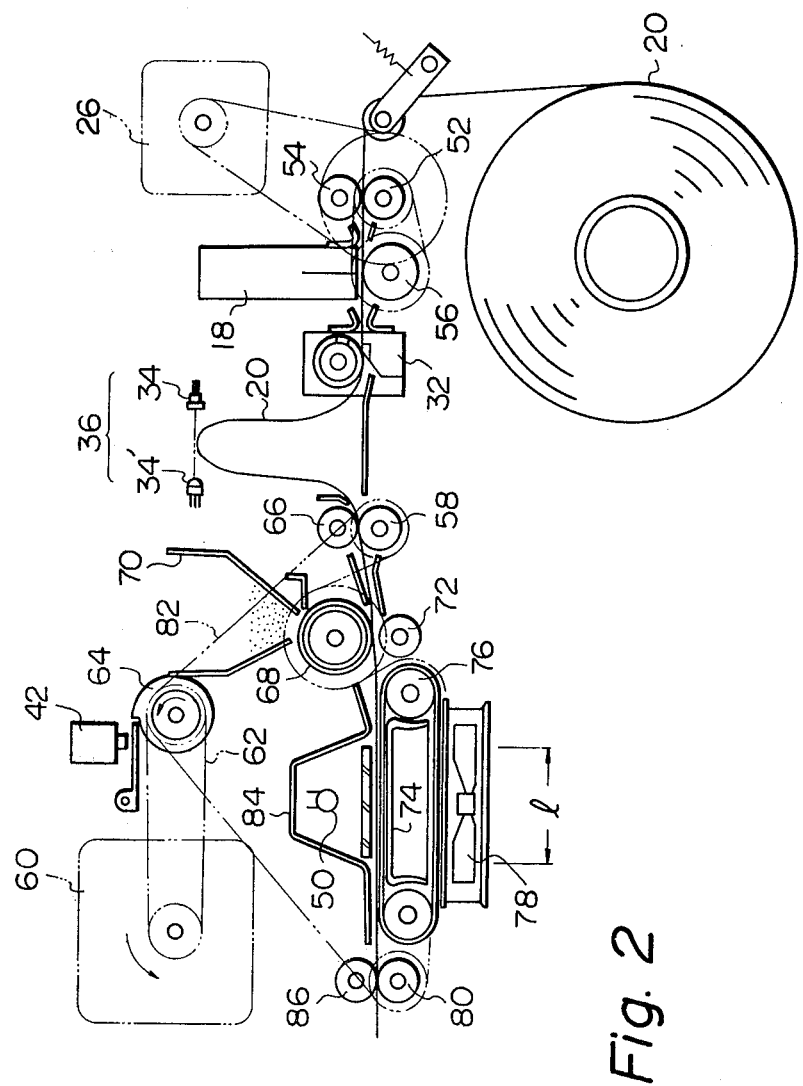
FIG. 2 shows a practical arrangement of the facsimile printing system shown in FIG. 1.

Referring to FIG. 2, a roller 52 is in driven connection with the stepping motor 26 so as to feed a sheet out of a roll 20 intermittently at a variable speed toward the recording head 18. In so feeding the sheet 20, an idle or driven roller 54 cooperates with the drive roller 52. A roller 56 is positioned below the recording head 18 in face-to-face relation thereto. The motor 26, rollers 52 and 54, head 18, roller 56 and cutter 32 in combination make up a latent image forming station in the printing system. The loop detector 36 comprises a light emitting diode 34' and a photosensor 34 which are interposed between the cutter 32 and a roller 58 for the optical detection of a predetermined amount of sheet loop. Under a specific condition of the roller 58, the sheet 20 forms a loop between the roller 58 and the cutter 32 as will be described until the top of the loop protrudes into the optical path between the diode 34' and the photosensor 34. The output signal of the photosensor 34 is coupled to the loop detector 36 (see FIG. 1) whose output is in turn coupled to the clutch solenoid 42 via the clutch control 38 and clutch solenoid drive 40, thereby actuating the solenoid 42. The output of the loop detector 36 is also supplied to the lamp 50 via the lamp control 46 and lamp drive 48 to energize the lamp 50. The lamp 50 comprises a xenon lamp for fixing a toner image on the sheet 20 as will be described.

An a.c. motor 60 is employed to drive various rotary elements included in the developing and fixing stations of the printing system. The rotation of the motor 60 is transmitted to a one-turn clutch 64 by an endless chain 62. In response to the output of the loop detector 36, the clutch solenoid 42 drives the one-turn clutch 64 for one full rotation. The roller 58 and an idle roller 66 driven thereby are positioned ahead of the developing station with respect to the direction of sheet feed. A magnet roller 68 is positioned below a toner hopper 70 which stores a magnetic toner therein. The magnetic roller 68 is rotatable in the same direction as the moving direction of the sheet 20 but at a peripheral speed twice that of the sheet 20, thereby supplying the sheet with the toner from the hopper 70 to develop a latent image on the sheet. A gap roller 72 is positioned in face-to-face relation to the magnetic roller 68. In the fixing station, illumination by the lamp 50 fixes the toner image on the sheet 20.

An endless conveyor belt 74 is passed around pulleys 76 to convey the sheet 20 layed flat thereon. The flat position of the sheet 20 on the belt 74 is ensured by a suction generated by a fan 78 which is located between the upper and lower runs of the belt 74. A roller 80 cooperates with an idle roller 86 to discharge the copy sheet 20 from the printing system onto a copy tray (not shown). All the rotary elements 58, 68, 76 and 80 described above are driven by the a.c. motor 60 by way of the common chain 82 and one-turn clutch 64. The reference numeral 84 in FIG. 2 denotes a reflector associated with the lamp 50 at the fixing station.

Referring also to FIG. 3, the operation of the printing system will be described hereinafter.

A sheet feeding pulse signal corresponding to an input data signal is coupled to the stepping motor 26 to drive it by way of the route previously discussed. Then, the motor 26 drives the sheet feed roller 52 so that the sheet is payed out from the roll 20 and fed toward the recording head 18 intermittently at a variable speed. The sheet 20 is formed with a latent image electrostatically thereon by the head 18 which will have started its operation then in response to the input video signal. Via the cutter 32, the sheet 20 advances until it abuts against the roller 58. At this instant, the output of the photosensor 34 is naturally low level maintaining the clutch solenoid 42 deenergized. The one-turn clutch 64 therefore remains unmoved or locked to keep the roller 58 also unmoved. In this situation, the increasing length of the sheet 20 fed by the roller 52 forms a loop detained between the roller 58 and cutter 32. When the loop grows to a predetermined height, its upper end interrupts the optical path between the light emitting diode 34' and photosensor 34. The resultant high level output of the photosensor 34 is supplied to the clutch solenoid 42 and lamp 50.

In response to this input, the clutch solenoid 40 is energized to unlock the one-turn clutch 64 to establish a torque transmission path from the a.c. motor 60 to the roller 58 via the clutch 64. The roller 58 then starts feeding the detained sheet 20 at a predetermined speed into the developing and fixing stations in succession. At the same time, the magnet roller 68 is driven by the common chain 81 so that the toner is fed by the roller 68 from the hopper 70 onto the sheet 20 to deveop the latent image carried on the latter. Meanwhile, the timer 44 (see FIG. 1) turns on the lamp 50 upon the lapse of a time period $T_1$ after it has received the high level output of the photosensor 34. By applying heat, the lamp 50 fixes the toner image on the sheet 20 which has undergone development and entered the fixing station during the time period $T_1$.

After one full rotation, the clutch 64 is locked again by the clutch solenoid 42 to in turn stop the rotations of the rollers 58 and 68. This interrupts the toner supply from the hopper 70 to the sheet 20 through the roller 68. The stepping motor 26 on the other hand continues its rotation as long as the sheet conveying pulse signal is appearing, whereby the roller 52 is operated to continuously pay the sheet out from the roll 20. As a result, the sheet will be detained to form another loop between the roller 58 and the cutter 32 and a series of previously described actions of the system will be repeated.

Now, when the supply of video signals to the printing system is terminated, the recording head 18 is deactivated but the stepping motor 26 is still supplied with sheet conveying pulses for an additional predetermined time period C. Accordingly, the roller 52 feeds the sheet 20 by a length corresponding to a blank area at the sheet end and the distance between the head 18 and cutter 32. As the predetermined time period C expires, the pulse supply to the stepping motor 26 is stopped whereupon the source of signal supply to the clutch solenoid 42 and lamp 50 is switched from the photosensor 34 to the timer 44. At the same time, a high level trigger signal is fed to the cutter 32 to cut the sheet 20 from the rest. Thereafter, the timer 44 supplies the clutch solenoid 42 and lamp 50 with its high level output at a predetermined period $T_2$ so that the trailing end of the cut sheet 20 is continuously advanced into the developing and fixing stations by each predetermined amount. From the fixing station, the trailing end of the sheet 20 is discharged by the roller 80 onto the copy tray.

The lamp 50 of the printing system has a fixing width 1 which is dependent on the length of an opening formed in the reflector 84. In accordance with the present invention, the opening length of the reflector 84 is determined to be an integral multiple of the amount of sheet which the roller 58 feeds at a time. The lamp 50 is energized in response to each output or each plurality of outputs of the photosensor 34. Then, the lamp 50 will fix a sheet 20 continuously without any spacing or overlapping. Meanwhile, the feeding action of the roller 58 will be repeated a plurality of times in an initial stage of a recording operation before the leading end of the sheet 20 reaches the fixing station. With this in view, an arrangement may be made such that for a plurality of initial actions of the roller 58 only the clutch solenoid 42 is activated with the lamp 50 kept deactivated (portions A in FIG. 3). This will prolong the life of the lamp 50 while saving power consumption.

Though an optical means was employed in the foregoing embodiment in order to detect a predetermined amount of sheet loop between the cutter 32 and roller 58, the amount of loop may be detected by counting the input pulses to the stepping motor 26.

In summary, it will be seen from the foregoing that the present invention provides a facsimile printing system which feeds a sheet accurately to a latent image forming station thereof by a small torque stepping motor, thereby reproducing clear-cut images on a recording sheet. The printing system employs a large torque a.c. motor for the sheet feed farther to developing and fixing stations for thereby eliminating a fluctuation in the relative speed between the sheet and developing means and thereby an irregular density distribution. Clear cut, even density images also result from accurate developing and fixing timings which are achievable with a simple construction.

Various modifications will become possible for those skilled in the art after receiving the teachings of the present disclosure without departing from the scope thereof.

What is claimed is:

1. A facsimile printing system for printing received data in compressed form on a copy sheet, comprising:
   first sheet feed means for intermittently feeding the copy sheet at a variable speed in accordance with the compressed data;
   sheet detaining means for temporarily detaining the copy sheet which is fed by the first sheet feed means; and
   second sheet feed means for feeding the copy sheet detained by the sheet detaining means by a predetermined amount at a predetermined speed after the amount of the copy sheet detained by the sheet detaining means reaches a predetermined value;
   said predetermined amount being selected such that the sheet detaining means and the second sheet feed means operate on the copy sheet a plurality of times for incrementally feeding the copy sheet.

2. A facsimile printing system as claimed in claim 1, in which the first sheet feed means comprises a stepping means.

3. A facsimile printing system as claimed in claim 1, in which the sheet detaining means detains the copy sheet in a loop form, the detaining means comprising photoelectric loop control means.

4. A facsimile printing system as claimed in claim 3, in which the photoelectric loop control means comprises a loop forming means and a loop detecting means.

5. A facsimile printing system as claimed in claim 4, in which the loop forming means comprises sheet feed rollers and the loop detecting means comprises a photosensor for detecting the loop of the copy sheet.

6. A facsimile printing system as claimed in claim 5, in which the photoelectric loop control means further comprises a drive control means for drivably controlling the sheet feed rollers to feed the copy sheet detained by the detaining means when the photosensor senses the loop of the copy sheet.

7. A facsimile printing system as claimed in claim 6, in which the drive control means comprises an AC motor which is in drivable connection with the sheet feed rollers and a clutch means intervened between the AC motor and sheet feed rollers to selectively establish a torque transmission path therebetween in accordance with a detection of the loop of the copy sheet.

8. A facsimile printing system as claimed in claim 1, further comprising imaging means for forming an electrostatic image of the received data on the copy sheet fed by the first sheet feed means.

9. A facsimile printing system as claimed in claim 8, further comprising a developing means for developing the electrostatic image on the copy sheet to produce a toner image thereof for a predetermined period of time while the copy sheet is fed by the second sheet feed means at the predetermined speed.

10. A facsimile printing system as claimed in claim 9, further comprising timer means which is activated during the predetermined period of time.

11. A facsimile printing system as claimed in claim 1, further comprising developing means and fixing means through which the copy sheet is fed by the second sheet feed means, the fixing means having a operative length in the sheet feed direction which is an integral multiple of said predetermined amount.

12. A facsimile printing system as claimed in claim 11, in which said integral multiple is one.

13. A facsimile printing system as claimed in claim 11, in which the fixing means comprises a flash type heat source.

14. A facsimile printing system as claimed in claim 7, in which the clutch means comprises a one-turn clutch which determines said predetermined amount.

* * * * *